April 20, 1937.  C. BROSSMAN  2,077,545
SEWAGE SLUDGE TREATMENT PLANT
Filed Dec. 3, 1935
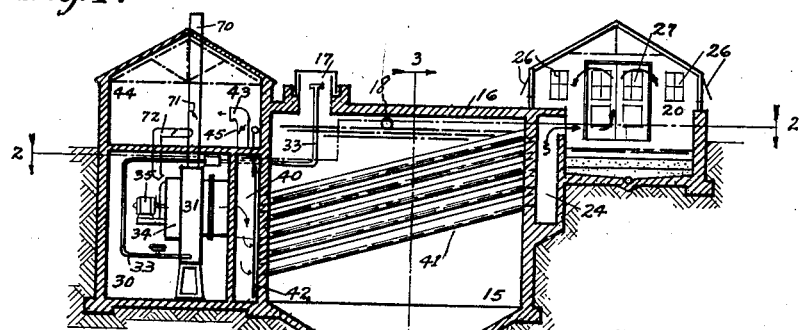
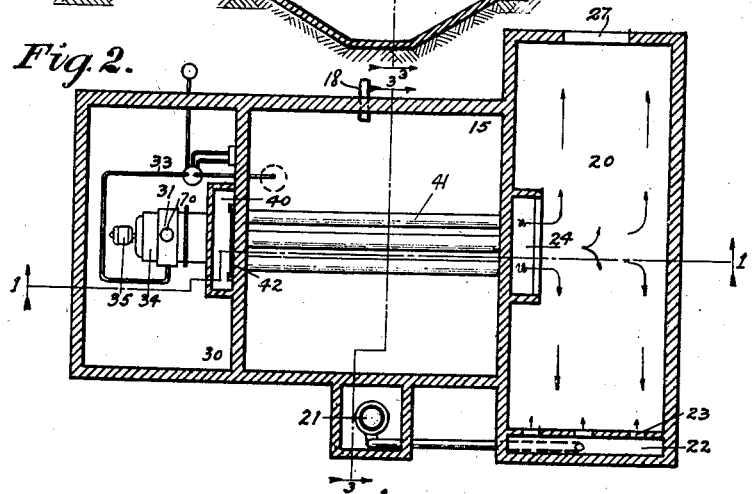
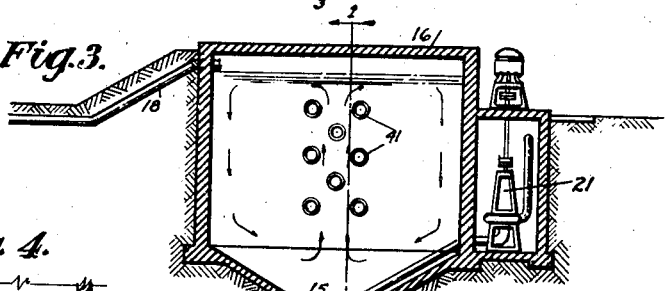
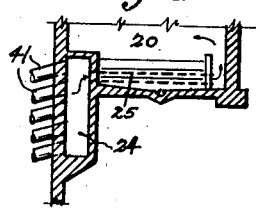
INVENTOR.
CHARLES BROSSMAN
BY
ATTORNEY.

Patented Apr. 20, 1937

2,077,545

UNITED STATES PATENT OFFICE 2,077,545

SEWAGE SLUDGE TREATMENT PLANT

Charles Brossman, Indianapolis, Ind.

Application December 3, 1935, Serial No. 52,699

4 Claims. (Cl. 210—2)

My invention relates to sludge-treatment, to facilitate and accelerate the digestion and drying of the sludge.

It is the object of my invention to provide effective and relatively inexpensive apparatus for utilizing the gas produced by the digestion of sludge to accelerate such digestion and the formation of gas, and desirably also to dry the sludge.

In carrying out my invention, I provide an enclosed digestion-chamber or digestion-tank for sewage sludge, so that the gas produced therein may be retained and utilized; and I burn that gas in a suitable heater, desirably of a standard type, which heats gaseous material, to supply heat to the sludge of the digestion chamber to accelerate such digestion, and desirably also to supply heat to dry the sludge in the sludge-drying chamber. The heated gaseous material from the heater may also be used for heating other rooms or chambers in the sludge-treatment plant, especially when such gaseous material is air.

I provide tubular passages by means of which the gaseous material so heated and the sludge of the digestion tank are brought into heat-transferring relationship to each other, to promote the digestion of the sludge and the formation of gas. These tubular passages may be located either within or outside of the digestion tank. Desirably I provide a blower (or compressor) for moving said heated gaseous material. As already stated, I desirably also provide a drying chamber for the digested sludge from the digestion tank, and to accelerate the drying of said digested sludge I carry hot gaseous material from said heater through said drying chamber.

The gaseous material supplied to the drying chamber is desirably hot air. The gaseous material supplied to the tubes located in the digestion tank or to or around the tubular passages if they are located outside of the digestion chamber may be either heated air or other heated gaseous material, such as recirculated gas from the digestion tank. When air is used the products of combustion may be mixed with it. The gaseous materials from the heater may be supplied separately to the tubes in the digestion tank and to the sludge-drying chamber, and if desired may be different gaseous materials; or they may be supplied from a common source, as when heated air is used, either in series or in parallel.

The tubes which are located in the digestion chamber and which carry heated gaseous material may be provided with perforations, through which the gaseous material may escape to produce agitation of the sludge; which is a feature that is especially advantageous when the gaseous material is recirculated gas that was originally generated in the digestion tank by the digestion of sludge therein.

When and if desired, the sludge-drying chamber may be omitted. So far as I am aware, however, I am the first to use a common heating source operated by the burning of gas from the digestion tank for heating both the digestion tank and a sludge-drying chamber.

The accompanying drawing illustrates my invention. In such drawing, Fig. 1 is a vertical longitudinal section, substantially on the lines 1—1 of Figs. 2 and 3, through one form of sludge-treatment plant embodying my invention, with the heater supplying hot air in series to the pipes in the sludge-digestion tank and to the sludge-drying chamber; Fig. 2 is a horizontal section on the line 2—2 of Fig. 1; Fig. 3 is a vertical section on the lines 3—3 of Figs. 1 and 2; and Fig. 4 is a fragmental section, showing a modification of the sludge-drying chamber that appears at the right side of Fig. 1.

The sludge-digestion chamber or tank 15 is provided with a cover or roof 16 in which is a collecting dome 17 in which gas generated in the digestion chamber or tank 15 collects. Sludge is supplied to this digestion tank 15 in any convenient or ordinary manner, as by a pipe 18.

Digested sludge, which collects in the bottom of the digestion tank 15, may flow or be pumped or otherwise removed therefrom to a sludge-drying chamber 20, which is any desired kind of drying apparatus. This may be done by a pump 21 (Figs. 2 and 3) which receives sludge from the bottom of the digestion tank 15 and pumps it into a receiving chamber 22 at one end of the drying chamber; and the sludge so pumped into the receiving chamber 22 flows over a weir 23 on to the draining floor, conveniently sand-covered, of the drying chamber 20 so that it spreads out thereover. The pump 21 need not be used if the draining floor is at a sufficiently low level to permit gravity flow thereto. The drying chamber 20 is shown as provided at one side with a hot-air-receiving sub-chamber 24, which receives hot air as hereinafter described, and discharges it into the drying chamber 20, either over the upper surface of the sludge therein as illustrated in Fig. 1 or through pipes 25 submerged in the sand on the draining floor and thence over the upper surface of such sludge as illustrated in Fig. 4. The drying chamber 20 is provided with suitable outlet vents 26, which may be either in the walls of said drying chamber or in the doors 27 which give thereinto or in both.

On one side of the digestion chamber 15 is a heater room 30, which contains one or more heater units 31. The heater unit (or units) is arranged to burn the gas produced by the digestion in the digestion chamber 15, and is supplied with such gas by a pipe 33 which has its entrance end located in the dome 17. The heater unit (or units) 31 is an air-heater, which heats air forced through it in any convenient manner, as by a blower 34 driven by an electric motor 35.

In the modification of Figs. 1, 2, and 3, the heater 31 discharges hot air into a header chamber 40 at the opposite side of the digestion chamber 15 from that at which the drying chamber 20 is located. Pipes 41 extend through the sludge in the digestion chamber 15 from the header chamber 40 to the hot-air-receiving sub-chamber 24 which supplies the drying chamber 20. These pipes 41, which may be of any desired number, conveniently (but not necessarily) are oblique so that they extend obliquely upward between their inlet and outlet ends, as is clear from Fig. 1. Their inlet ends, which communicate with the header chamber 40, are controlled by a damper 42.

The header chamber 40 may also supply a hot-air discharge pipe 43 which discharges hot air therefrom into a supplemental chamber 44 shown as located over the heater room and usable for any desired purposes, as for a laboratory and/or office at the plant. A damper 45 controls such discharge.

In the operation of this system shown in Figs. 1, 2, and 3, the gas generated in the digestion chamber 15 collects in the dome 17, and thence is supplied to the heater unit 31 and there burned. The heat of combustion heats air which is forced through said heater unit by the blower 34. This heated air is supplied to the header chamber 40, from which any desired amount may pass by the hot-air discharge pipe 43 into the supplemental chamber 44. However, the bulk of the hot air supplied to the header chamber 40 is forced into and through the pipes 41, under the control of the damper 42, and passes from those pipes into the sub-chamber 24 and thence either directly as in Fig. 1 or indirectly as in Fig. 4 over the surface of the drying sludge in the drying chamber 20, whence it escapes through the vents 26. In this arrangement, the heated air passes in series through the pipes 41 and the drying chamber 20. The hot air passing through the pipes 41 heats the sludge in the digestion chamber 15 and accelerates the digestion thereof and the formation of gas therefrom to supply the heater 31.

If desired, the products of the combustion within the heater unit 31 of the gas supplied thereto from the dome 17 may be allowed to escape wholly or partly into the air, as by way of a stack 70 (Fig. 1); but such escape into the air by way of the stack 70 may be wholly or partly cut off by a damper 71, and such products of combustion supplied by a pipe 72, provided with a damper 73, to the inlet of the blower 34, as is clear from Fig. 1. When the damper 73 is open, and especially when the damper 71 is at the same time closed, the products of combustion from the burner 41 are drawn through the heater 31, and mixed with additional air that the blower may draw in; and pass with such air through whatever heat-transferring and/or drying apparatus to which such heated air is supplied.

My invention is susceptible of many other variations, but the modifications which are illustrated are sufficient to indicate the general character of the invention and its susceptibility of modification.

I claim as my invention:

1. A sewage sludge treatment plant, comprising a sludge-digestion tank, an enclosed sludge-drying chamber having an outlet to the atmosphere, a heating device which heats gaseous material and burns combustible gas produced in said sludge-digestion tank, and heating tubes located in said sludge-digestion tank and communicating with said heating device and with said sludge-drying chamber, said heating device being arranged to supply heated gaseous material to said heating tubes and thence to said sludge-drying chamber and thence to the atmosphere.

2. A sewage sludge treatment plant, comprising a sludge-digestion tank, an enclosed sludge-drying chamber having an outlet to the atmosphere, and air-heating device which burns combustible gas produced in said sludge-digestion tank, and means for carrying heated air from said air-heating device into heat-transferring relation to the sludge of said sludge-digestion tank and thence to said sludge-drying chamber and thence to the atmosphere.

3. A sewage sludge treatment plant, comprising a sludge-digestion tank, an enclosed sludge-drying chamber having an outlet to the atmosphere, a heating device which heats gaseous material and burns combustible gas produced in said sludge-digestion tank, heating tubes located in said sludge-digestion tank and communicating with said heating device and with said sludge-drying chamber, said heating device being arranged to supply heated gaseous material to said heating tubes and thence to said sludge-drying chamber and thence to the atmosphere, and a blower for causing the movement of said gaseous material.

4. A sewage sludge treatment plant, comprising a sludge-digestion tank, an enclosed sludge-drying chamber having an outlet to the atmosphere, an air-heating device which burns combustible gas produced in said sludge-digestion tank, means for carrying heated air from said air-heating device into heat-transferring relation to the sludge of said sludge-digestion tank and thence to said sludge-drying chamber and thence to the atmosphere, and a blower for moving said heated air.

CHARLES BROSSMAN.